United States Patent [19]
Hudson et al.

[11] Patent Number: 5,818,517
[45] Date of Patent: Oct. 6, 1998

[54] BROADBAND INTERFERENCE REDUCTION

[75] Inventors: John Edward Hudson, Stansted; Robin Paul Rickard, Bishop's Stortford; Christopher John Reed, Harlow, all of United Kingdom

[73] Assignee: Northern Telecom Limited, Montreal, Canada

[21] Appl. No.: 747,585

[22] Filed: Nov. 13, 1996

Related U.S. Application Data

[63] Continuation-in-part of Ser. No. 152,290, Nov. 12, 1993, abandoned.

[51] Int. Cl.$^6$ ............................... H04N 5/21; H04B 1/06
[52] U.S. Cl. .................... 348/21; 348/726; 348/607; 348/614; 455/275; 455/278.1; 455/63; 375/347
[58] Field of Search ............................. 348/725, 21, 607, 348/624; 455/134–135, 138, 140, 275, 276.1, 277.2, 278.1, 63; 375/347; H05N 2/213

[56] References Cited

U.S. PATENT DOCUMENTS

| | | |
|---|---|---|
| 4,503,461 | 3/1985 | Nishimura .............................. 378/98.12 |
| 4,893,350 | 1/1990 | Minamisono et al. ............... 455/278.1 |
| 5,023,620 | 6/1991 | Matsuura ................................. 342/362 |
| 5,045,945 | 9/1991 | Herman et al. ......................... 348/614 |
| 5,119,196 | 6/1992 | Ayanoglu et al. ...................... 348/607 |
| 5,161,018 | 11/1992 | Matsunaga .............................. 348/607 |

*Primary Examiner*—Andrew I. Faile
*Assistant Examiner*—Reuben M. Brown
*Attorney, Agent, or Firm*—Lee, Mann, Smith, McWilliams, Sweeney & Ohlson

[57] ABSTRACT

A method and apparatus of reducing interference in a broadband radio frequency link is disclosed. Different signals are received by two antenna elements, in a first case the signals comprise differently polarized signals at the same or an offset frequency; in a second case the signals comprise a wanted signal and an interference signal, wherein the interfering signal is treated as an independent channel. The method comprises the steps of receiving radio frequency signals on two independent paths, selecting a portion of the radio frequency signal in each receive path or the desired signal path after demodulation where a predetermined frequency or band of frequencies is known to be absent; measuring the signal power; determining weights in a feedback path; and applying the feedback control signals to an algorithm which determines the weight(s) applied to the wanted signal such that the signal power in the summed signal(s) due to the interfering signal is reduced or cancelled.

14 Claims, 8 Drawing Sheets

$$dP/dW_r = \frac{P(W_r+\delta)-P(W_r-\delta)}{2\delta}$$

$$dP/dW_i = \frac{P(W_i+\delta)-P(W_i-\delta)}{2\delta}$$

$$W(k+1) = W(k) + \mu(dP/dW_r + jdP/dW_i)$$

BROADBAND INTERFERENCE REDUCTION

RELATED APPLICATION

This application is a continuation-in-part of co-pending U.S. patent application Ser. No. 08/152,290, filed Nov. 12, 1993, and now abandoned.

FIELD OF THE INVENTION

This invention relates to a method and apparatus for reduction or cancellation of signal independent interference in a broadband radio frequency link, such as a satellite TV link.

BACKGROUND TO THE INVENTION

Interference problems arise when signals from a terrestrial microwave link are received in the sidelobes of a radio frequency antenna or when signals are received from another satellite. In these cases the interference may be received from an angle of arrival at which the gain of the main antenna is 25 dB below the main beam gain. Similar problems arise between FM carriers with the same centre frequency but at different polarisations, such as satellite TV signals. It has been established by experiment that an isolation of approximately 30 dB is required between the carriers for the interference to be invisible to the human eye, if both carriers are at the same centre frequency. However, during unfavorable propagation conditions the isolation between the polarisation can fall to 20 dB or less. At present this potential problem is avoided by offsetting the carrier frequencies of TV signals, since it has been observed that less isolation is required in this case. However, the solution is not ideal as more TV channels could be transmitted in a given band if this were not necessary. In both of these cases, the interfering signals are independent of the desired signal and are not distorted replicas of the wanted signals, such as ghost signals. Signal independent interference is accordingly difficult to cancel, since no information is known about the content of the interference signal.

A great deal of work on reduction of interference has been carried out in the field of adaptive antennas for military applications, and the techniques used fall into the categories of Perturbation Loop, Correlation Loop, and Direct Solution, in order of increasing complexity and speed. However, these techniques are generally applied in the known absence of the wanted signal and they are simply aimed at minimising the power in a given channel. This is achieved by generating weighting values in amplitude and phase to apply to the signals picked up from the elements of an antenna array, such that the reception pattern of the array is given nulls in the direction of arrival of the interference source.

Such systems could conceptually be adapted for the present requirement, but the difference here is that the wanted signal carrier is present during adaptation against the interference. It is assumed that a channel is available carrying a sample of the interfering signal. The algorithm could then control a single weight which adjusts the sample of the interference signal in amplitude and phase and then adds this onto the main channel to cancel the interference on that channel vectorially.

However, IF carrier power minimisation algorithms are of limited value if the interference is at a low level relative to the wanted signal, and also if the sample of interference is corrupted with wanted signal. Hence these techniques are only of value at the lower end of the carrier-to-interference ratio range in the requirement, i.e. when the interference is dominating the wanted signal.

Figure 1A:
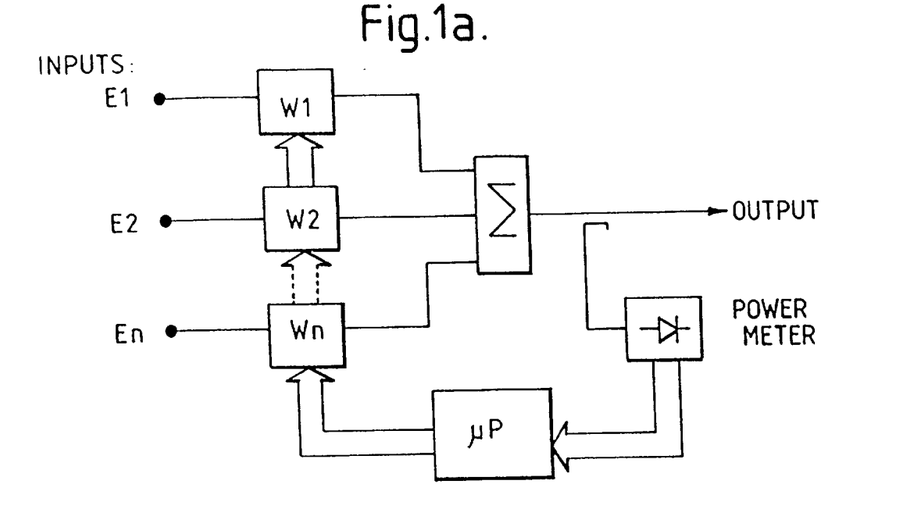
FIG. 1a–1c illustrate the configuration and operation of a basic perturbation processor (already referred to)
Figure 1B:
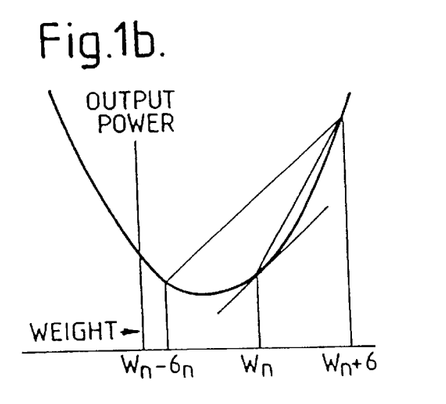
Figure 1C:
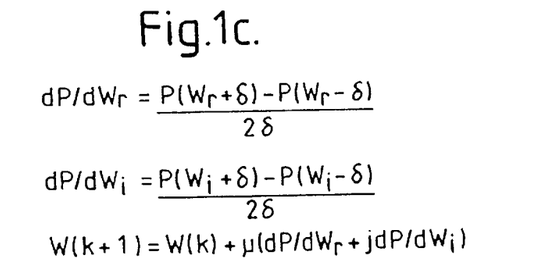

FIG. 1$a$ shows a block diagram of a simple perturbation loop. The algorithm perturbs a weight as shown in FIG. 1$b$ both up and down in value, and performs a measurement of output power at each point. The gradient of the function of output power against weight value is then calculated, and the weight is then updated in the direction of reduced output power. The update equation is given in FIG. 1$c$, showing that the update step sizes are scaled by the gradient to give a constant loop stability. However, this equation assumes the absence of a wanted signal masking the changes in interference power. In the case of this interference canceller, it is not possible to adjust sensibly the step sizes in this situation, and so they would be set to 1 LSB to ensure loop stability.

Figure 2:
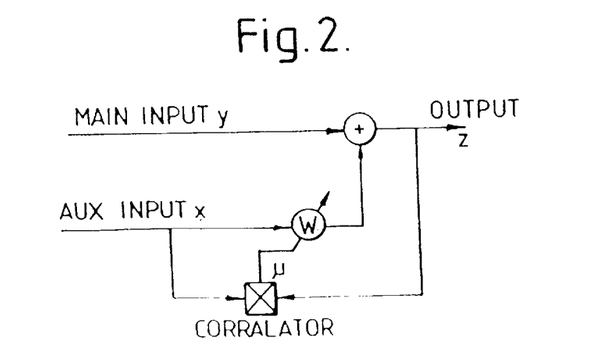
FIG. 2 illustrates a basic correlation loop (already referred to)

A basic correlation loop is shown in FIG. 2. In common with the perturbation loop, the correlation loop drives the weights on the basis of an estimate of the gradient of the output power as a function of weight value. The gradient is calculated by the correlation between the output signal from the canceller and the input channel carrying the sample of interference. The complex correlation can be performed digitally, and requires the signals to be converted to in phase and quadrature components at baseband.

Since both the perturbation and the correlation techniques are based on steepest descent gradient measurement algorithms, they will both settle at the same solutions albeit at different rates. The perturbation algorithm can also be given a low loop gain to minimise weight jitter, by basing each weight update on the average of a large number of perturbation measurements. The perturbation processor should in principle be able to produce nulls as deep as the correlation processor. The difference between the two techniques is in speed and cost.

The direct solution technique is used in adaptive antenna systems when the shortest possible adaptation time constants are required. This is an open loop approach, i.e. the weights are calculated directly from a measure of the correlation between the signals from each element of the antenna without any feedback. Because of the inaccuracies involved in analogue weighting, this approach is restricted to digital weighting of digitised signals.

OBJECT OF THE INVENTION

It is an object of the invention to provide an apparatus and method for reducing or cancelling the effects of interference in a broadband radio frequency link wherein the interference signals are independent of the desired signal.

SUMMARY OF THE INVENTION

According to the present invention there is provided a method of reducing the effect of interference on a desired radio frequency signal, said interference being constituted by a second radio frequency signal having the same or offset carrier frequency as the first signal, but having a different polarisation, the method comprising the steps of:

receiving radio frequency signals on two independent receive paths selecting a portion of the radio frequency signal in each receive path after demodulation where a predetermined frequency or band of frequencies is known to be absent;

measuring the signal power in each receive path in said signal portion;

splitting off from each receive path a portion of the signal in the channel;

applying to the split off signal portion of each receive path one or more weights;

summing the weighted portion of the signal in each receive path with the remaining radio frequency signal in the other receive path;

deriving from the summed signals in each receive path, feedback control signals; and applying the feedback control signals to an algorithm which determines the weight(s) applied to the split off portion of the signal in the other receive path such that the signal power in the summed signals in each receive path due to the interfering signal in the other receive path is reduced or cancelled.

According to one aspect of the invention wherein the radio frequency link signal is a TV signal, the portion of the radio frequency link signal selected comprises a portion of the vertical blanking interval of the demodulated television signal.

According to a further aspect of the invention, the perturbation algorithm is applied independently to a series of time delayed weights the outputs of which are all summed with the radio frequency link signal.

In accordance with a further aspect of the invention, there is provided an apparatus for reducing interference on desired broadband radio frequency signal wherein the interference is constituted by a second radio frequency signal having the same or offset carrier frequency as the first link, but having a different polarization, the apparatus comprising:

independent first and second receive paths means for selecting a portion of the radio frequency link signal in each receive path after demodulation where a predetermined frequency or band of frequencies is known to be absent;

means for measuring the signal power in each receive path in each signal portion;

means for splitting off from each receive path a portion of the signal in the receive path;

means for applying to the split off portion in each receive path one or more weights;

means for summing the weighted signal portion in each receive path with the remaining radio frequency signal in the other receive path;

means for deriving from the summed signals in each receive path feedback control signals, and;

means for applying the feedback control signals to an algorithm which determines the weight(s) applied to the split off portion of the signal in the other receive path such that the signal power in the summed signals in each receive path due to the interfering signal in the other receive path is reduced or cancelled.

In accordance with a further aspect of the invention, there is provided a method of reducing the effect of an interfering signal on a wanted broadband radio frequency signal, said interfering signal being treated as an independent channel, having the same or offset carrier frequency as the first signal, the method comprising the steps of:

receiving the radio frequency signals on two independent receive paths;

selecting a portion of the radio frequency signal in the wanted signal receive path where a predetermined frequency or band of frequencies is known to be absent;

perturbing one or more weights;

measuring the signal power in the signal portion;

splitting off from the channel a portion of the signal;

applying to the split off signal portion of the channel one or more weights;

summing the weighted portion of the signal in the channel with the remaining radio frequency signal in the other channel;

deriving from the summed signals in each channel, feedback control signals; and applying the feedback control signals to an algorithm which determines the weight(s) applied to the split off portion of the signal in the other channel such that the signal power in the summed signals in each channel due to the interfering signal in the other channel is reduced or cancelled.

When the radio frequency link signal is a TV signal, preferably the portion of the radio frequency link signal selected comprises a portion of the vertical blanking interval of the demodulated television signal.

Preferably the perturbation algorithm is applied independently to a series of time delayed weights the outputs of which are all summed with the radio frequency link signal.

In accordance with a still further aspect of the invention, there is provided an apparatus for reducing interference in a wanted broadband radio frequency link wherein an interfering signal is treated as an independent channel, the apparatus comprising:

independent first and second receive paths means for selecting a portion of the wanted radio frequency link signal wherein a predetermined frequency or band of frequencies is known to be absent;

means for measuring the signal power in each channel in said portion;

means for splitting off from each channel a proportion of the signal in the channel;

means for applying in each channel one or more weights to the split off proportion of the signal;

means for summing the weighted proportion of the signal in each channel with the remaining radio frequency signal in the other channel; and, means for deriving from the summed signals in each channel feedback control signals to control the weight(s) applied to the split off proportion of the signal in the other channel;

wherein the feedback signals are derived to apply a weight control algorithm to the weight(s) such that the signal power in the summed signals in each channel due to the interfering signal in the other channel is reduced or cancelled.

BRIEF DESCRIPTION OF THE DRAWINGS

Embodiments of the invention will now be described with reference to the accompanying drawings, wherein.

DESCRIPTION OF THE PREFERRED EMBODIMENTS

Figure 3:
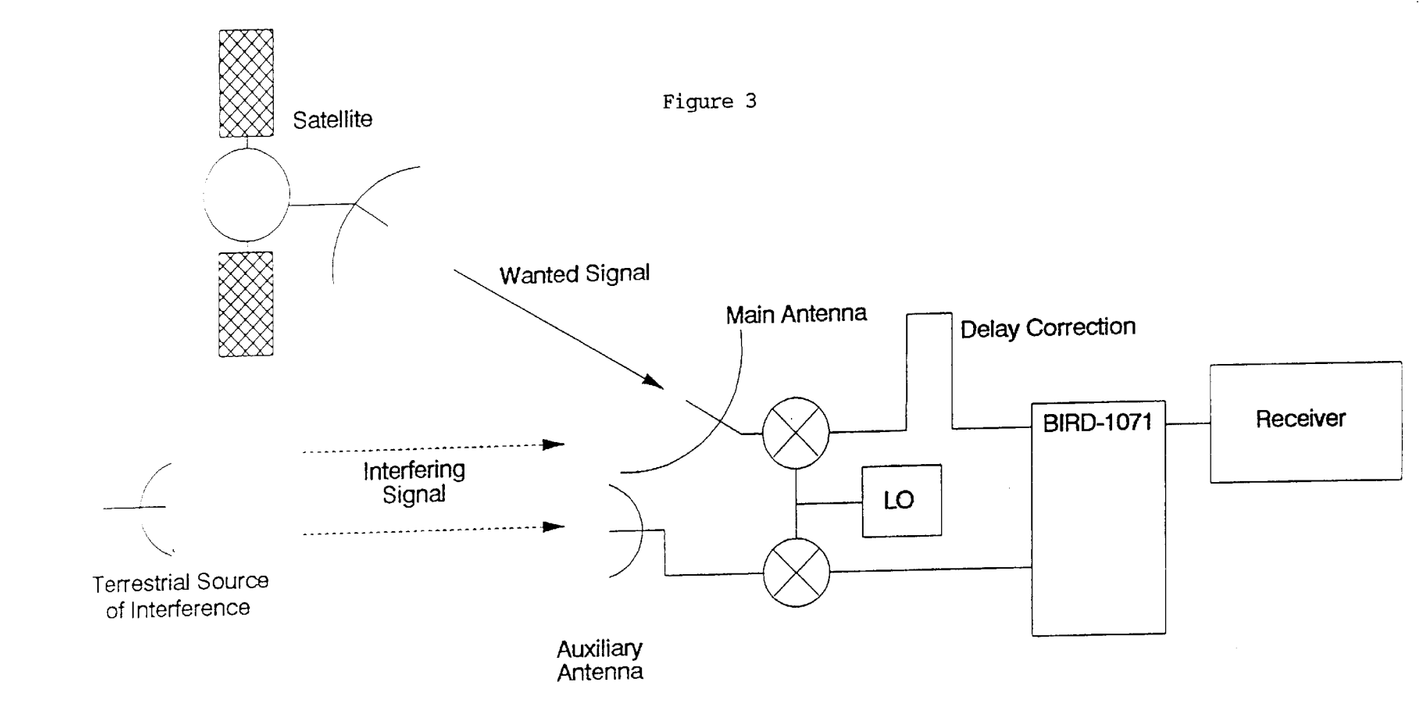
FIG. 3 illustrates a scenario of a satellite receiver in accordance with a first embodiment of the invention.

FIG. 3 shows a scenario involving a first embodiment of the invention wherein interference from sources other than the desired signal source is received, e.g. interference from a terrestrial microwave link which is received in the sidelobes of the antenna. In this case in addition to the first, main antenna which is arranged to receive the wanted signal, a second antenna is required to preferentially receive an interfering signal. In an application such as this where a single channel is being protected, the circuit can be configured whereby a weighting factor is applied to the interference signal.

Figure 4:
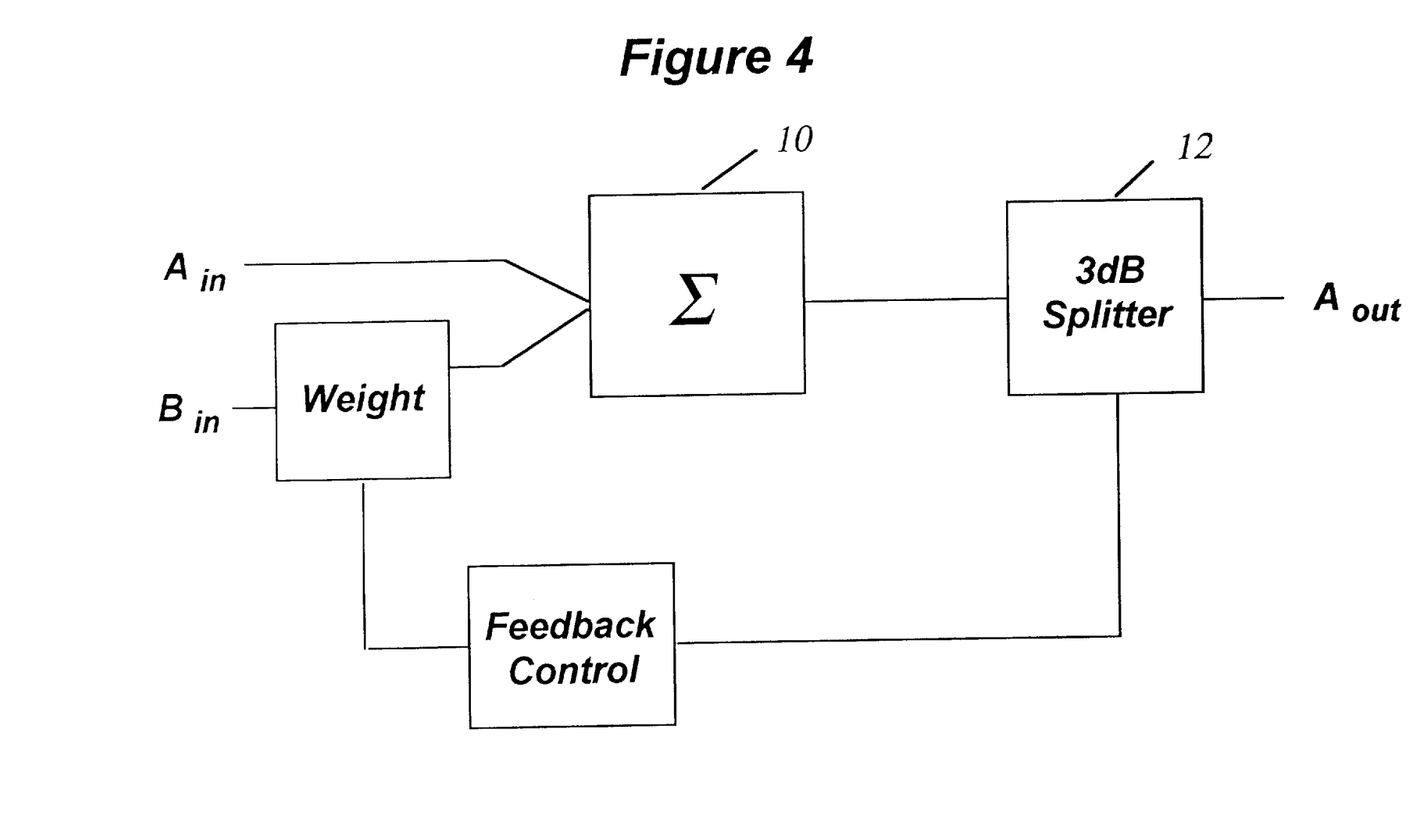
FIG. 4 is an outline block diagram of an arrangement for cancelling interference on a single radio frequency channel.
Figure 5:
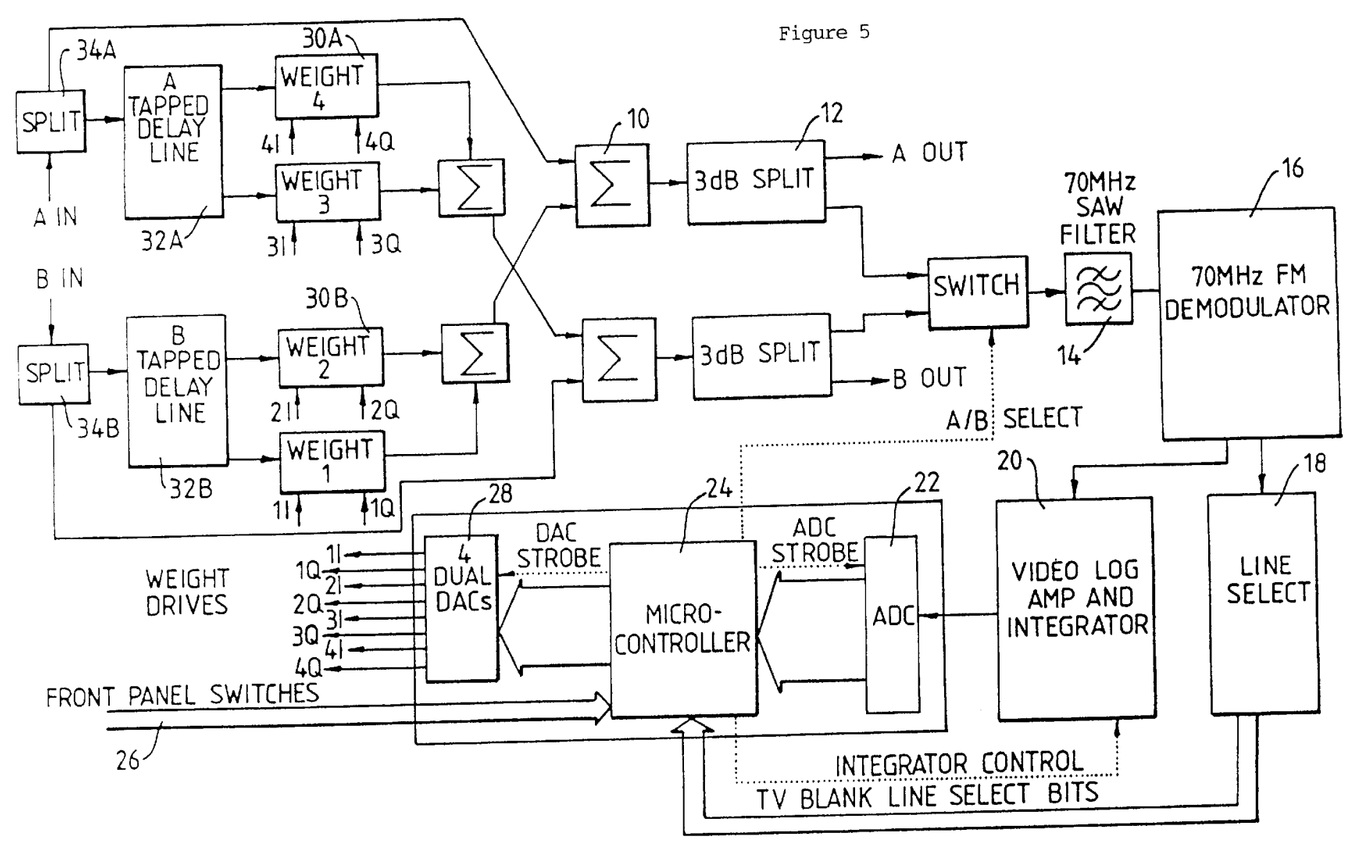
FIG. 5 is a more detailed version of the arrangement shown in FIG. 3.

FIGS. 4 and 5 show details of the embodiment comprising a receiver module adapted to receive signals from two antenna elements; the wanted signal channel is identified as A and the interference is identified as channel B. It is assumed that, in the case of a satellite radio frequency down link, the radio frequency signals have already been down converted to VHF frequencies. The channel A signal is summed with the weighted signal B in summing network 10. The summed signals are fed to a 3 dB splitter 12 one output of which is the channel A signal; the other output leads to a feedback loop operable to control a weight which is applied to the B signal.

FIG. 5 shows the feedback in greater detail; the feedback input is first passed through a bandpass filter 14, typically for television signals operating at 70 MHz with a bandwidth of 20 MHz to define the adaptation band. The filtered signal is applied to a demodulator 16 and demodulated to provide demodulated analogue signals. The demodulated signals are applied to the line selector circuit 18 and separately to an envelope detection circuit 20, e.g. for TV signals a video logarithmic amplifier and integrator. The amplified and integrated analogue signals are then converted to digital signals in an analogue-to-digital converter (ADC) 22.

Conveniently, four weights—as shown in FIG. 5, can be used on portions of the interference signal delayed by successive amounts, enhancing its broadband performance. A video signal to-interference-plus-noise optimization algorithm can be used to drive the adaptation of the weights, or an IF power minimization algorithm can be selected which can be used when the device is protecting a single channel. This algorithm can be used to cancel interference which is being received at high levels which prevent the video loop from operating by corrupting the synchronization pulses. The IF power minimization loop can also be used to protect a channel carrying any type of signal, not necessarily TV.

The arrangement measures the signal-to-noise plus interference S/(N+I) by measuring the power in a portion of the TV signal which is known, a priori, to be blank. Any power detected is thus known to be noise or interference and the weights are driven to minimise this, thus maximising S/(N+I). In order to cancel the interference preferentially, it is necessary to derive a measure of the signal to interference ratio to drive the loop. This can be done once the signal is demodulated, using prior knowledge of some aspect of the wanted signal format. In the case of TV signals, there are times within the format at which known waveforms are transmitted; any deviations from these are known to be interference. The most convenient portions of the signal for this are the blank lines in the vertical blanking interval of NTSC and PAL TV formats; power detected on these lines can be minimized by the loop, thereby cancelling the interference. In the case of digital signals with error correction coding, the prior knowledge of the allowed codes is used as the discriminate; an error rate count can be used as the error signal in the feedback loop.

The line select circuit 18 is programmed to select those lines of the signal which are known to have an absence of predetermined signal frequency. The lines chosen for perturbation can be changed if required, e.g. by the inclusion of manually settable switches (not shown) inside the line select circuit 18. For example, the line select circuit 18 detects line and frame synch in 525 or 625 line TV signals. The wanted signal is defined as the one from which the synch is detected, i.e. the more powerful signal. Pulses are provided for a microprocessor control circuit 24 corresponding to preselected lines known to be blank in the TV signal. Two lines are chosen per field, which are used for up and down perturbations respectively in the perturbation algorithm subsequently utilised in controlling the weights applied to the B channel. In this way the perturbations are not visually intrusive on the TV picture. Any non-DC signal appearing in these two lines can therefore be assumed to be due to interference. The colour sub-carriers of both 525 and 625 line formats fall in the pass band of the video band-pass filter and form a convenient signal to which to tune the power detector circuit.

The circuitry for the video mode of operation will work with conventional NTSC, PAL, or SECAM composite video signals with negative-going synch pulses. The details of the timing are as follows: Lines 10 and 16 and the equivalent lines in the second field are selected for perturbation. On detection of the line synch pulse for line 10, the in phase or quadrature component of one of the weights is perturbed up in a digital value. 14 $\mu$s is allowed for the weight to settle, and then the output from the video log amps is integrated for 38 $\mu$s, after which time the analogue-to-digital converter is triggered. On line 18, the process is repeated for a down perturbation of the digital value of the same weight. In the second field the process is repeated on the two equivalent lines, but with the down perturbation before the up. The weight is then updated by 1 LSB in the direction that was found to give a decrease in integrated signal power, on the basis of a vote between the results for the two field. If the results for the up-down and down-up perturbation pairs disagree, then there is no update to the weight. Each In phase and Quadrature component of each weight is updated on successive frames.

An initial accelerated "coarse" mode of adaptation can be set up, using switch controls 26, which gives larger perturbations and larger updates but which will achieve slightly less cancellation. Once this "coarse mode" has been utilised, say after 30 seconds, it can then be followed by a "fine" mode to obtain maximum adaptation. The weights are produced by digital-to-analogue converters (DAC) 28 under the control of the micro controller 24, which also produces strobe timing for the ADC 22,m the DAC 28 and the envelope detection circuit 20. The weights provided by the DAC 28 are applied to weighting circuits 30. The interference signal in channel B is fed into a tapped delay line 32 having four outputs each of which is fed to a separate one of the weighting networks 30. The B channel signal is thus split into four parts which are delayed nominally by 0, 2.5, 5.0 and 7.5 ns respectively, relative to the through path of the A channel. These delay line outputs are weighted in amplitude and phase by the applied weights from the DAC 28 under the control of the microprocessor 24. The weighted outputs are combined with the A channel signal in summing network 10 to form a broadband null. Deeper nulls can be achieved with closer tap spacing; using a tap spacing of 2.5 ns to cancel interference which is coupled onto the main channel with a delay of 4.5 ns, null depths of approximately 30 dB can be obtained over a 20 MHz band with 4 taps. This is sufficient for many practical purposes.

The coarse delay correction needs to be assessed on installation so that it is of the order of a few nanoseconds (i.e. a foot or so of cable). With knowledge of the angle of arrival of the signal from the satellite and of the interference, the relative delay between the two can be calculated and compensated for with an appropriate length of cable. For fine adjustment of the delay, an indication of whether the delay is too long or too short can be had by adapting the processor and then pausing. By removing each weight connection in turn, it can be seen which is contributing most to the cancellation; if removing the 7.5 ns tap degrades the picture most, it can be assumed that this weight is large, and this indicates that the delay needs to be longer. If the 0 ns weight is largest, then the delay should be shorter. Alternatively, a set of cable sections differing in delay by 1 ns could be tried in turn.

Figure 6:
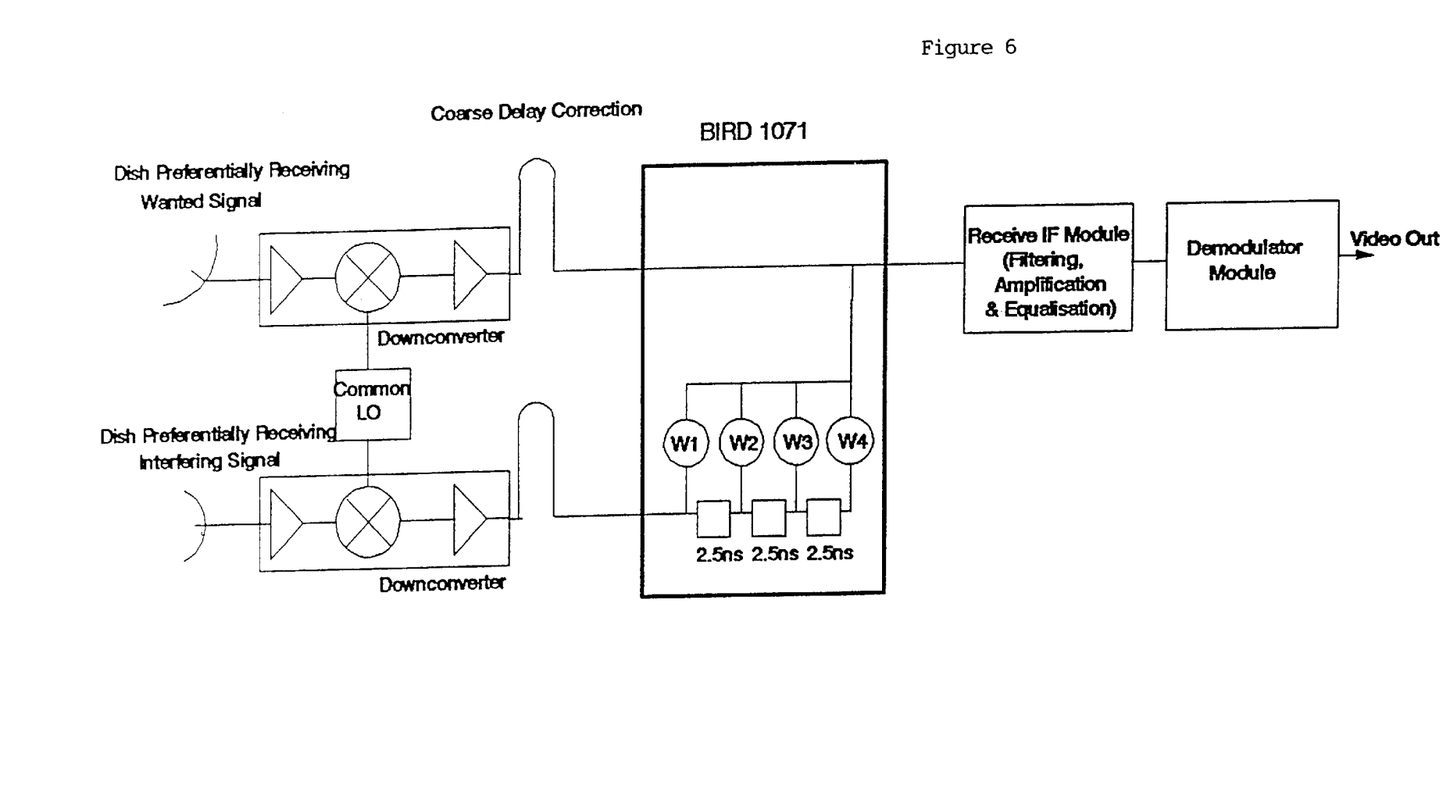
FIG. 6 illustrates a schematically the installation of a satellite receiver in accordance with a first embodiment of the invention.

FIG. 6 shows a typical arrangement for the case where a first antenna preferentially receives a wanted signal and a second or auxiliary antenna preferentially receives an interfering signal. The antennas each lead to separate down converters where signals are converted to baseband. Both down converters must be driven from a common local oscillator. After passing through an interference reduction device, the signals are passed to a receive intermediate frequency module and through to a demodulator to provide, for example, a video signal. The motion of the satellite will not affect the cancellation, nor will there be a problem if the uplinks are originated at different earth stations.

The use of several tapped delay lines increases the broadband cancellation depth possible if the coupling mechanism between the interference and the wanted channel is dispersive, and reduces the requirement for extremely accurate matching of group delay between the coupling and cancellation paths. In addition, the requirement for a weighting network with extremely low dispersion is eased, resulting in a lower cost and more robust design.

The tapped delay line can be implemented with suitably cut lengths of coaxial cable to provide the delay elements. One delay line is provided each for channel A, consisting of a five way splitter and five lengths of cable. One length of cable provides Main (unweighted) path for channel A, and the other four are used as delay elements to be connected to the appropriate weights which are used to cancel interference on channel B. There is a similar delay line provided for channel B. The losses through the individual cables can be compensated for by an attenuator and an initial amplification stage is provided to compensate for the overall loss.

The canceller is required to maintain cancellation across a 20 MHz band, but there may be a difference in delay between the interfering carrier on the wanted channel, and the sample of interference in the auxiliary channel. In this case the phase relationship between the two will vary across the band and so a single weight can only produce perfect cancellation at a spot frequency. To produce perfect broadband cancellation, it is necessary to match the delays between the two channels exactly. This may not be possible, and in this case a tapped delay line can be used. As long as the delay error falls within the range of the delays provided by the delay line, an approximation to a broadband null can be built up by applying appropriate weights. If the delay happens to coincide exactly with the delay of one of the taps, then a single weight can form a perfect broadband null. If, however, the delay falls between two taps, then the processor will adjust the weights to form the best solution possible. For narrow tap spacings, the cancellation can be very good, but it will degrade for wider tap spacings. This is because although the cancelling signal can be given the correct phase slope with frequency, there will be a spurious amplitude slope introduced which will prevent perfect broadband cancellation. The amplitude slope is steeper for the wider tap spacings.

The gain required from the auxiliary antenna depends on the level of interference being received in the main antenna and the power of the interfering carrier. In other words, the important factor is the gain of the main antenna in the direction of the interference source compared with the main beam gain. The signal on the auxiliary channel will be added in antiphase onto the main channel so that the interference components cancel vectorially, and if the C/N of the interference in the auxiliary channel is equal to the C/N of the interference in the wanted channel, then the noise floor will be raised by 3 dB. It seems reasonable to require that the C/N of the interference signal should be at least 10 dB higher in the auxiliary channel than in the main channel, in which case the noise floor will be raised by less than 0.5 dB.

As an example, consider the case of interference from a terrestrial source being received in the sidelobes of the main antenna, from an angle of arrival at which the gain of the antenna is 50 dB below the main beam. To meet the requirement that the C/N of the interference should be 10 dB greater in the auxiliary channel than in the main channel, the auxiliary antenna can have, as minimum, a gain 40 dB less than the gain in the main antenna. The auxiliary antenna could be quite a small dish mounted on the rim of the main antenna dish. The level of wanted signal received in the auxiliary dish would be very low, and so the IF power minimization technique would be applicable here, and the cancellation could be further enhanced by the use of the video S/(N+I) optimization mode.

As a second example, consider the cancellation of interference received from another satellite. In this case the interference may be received from an angle of arrival at which the gain of the main antenna is 25 dB below the main beam gain. In this case the auxiliary antenna gain should be a minimum of 15 dB below the gain of the main dish, but should preferably be higher in order to minimize the noise added to the main channel. Hence in this case the auxiliary dish will be almost as big as the main dish. In this case it is likely that the level of wanted signal received in the auxiliary will be quite high, and so this will limit the performance of the IF power minimization mode. The video S/(N+I) optimization mode is best in this application.

The invention is particularly suited to the case of interference between FM TV carriers with the same centre frequency but at different polarizations. For example, in the case of the Occasional Use TV Service there is currently a maximum of three 20 MHz TV channels that can be transmitted on the global beam using two 40 MHz transponders, transmitting on left-hand and right-hand polarizations. Two channels are transmitted on one polarization, and the third channel is transmitted on the other polarization at a carrier centre frequency midway between the other two.

Figure 7:
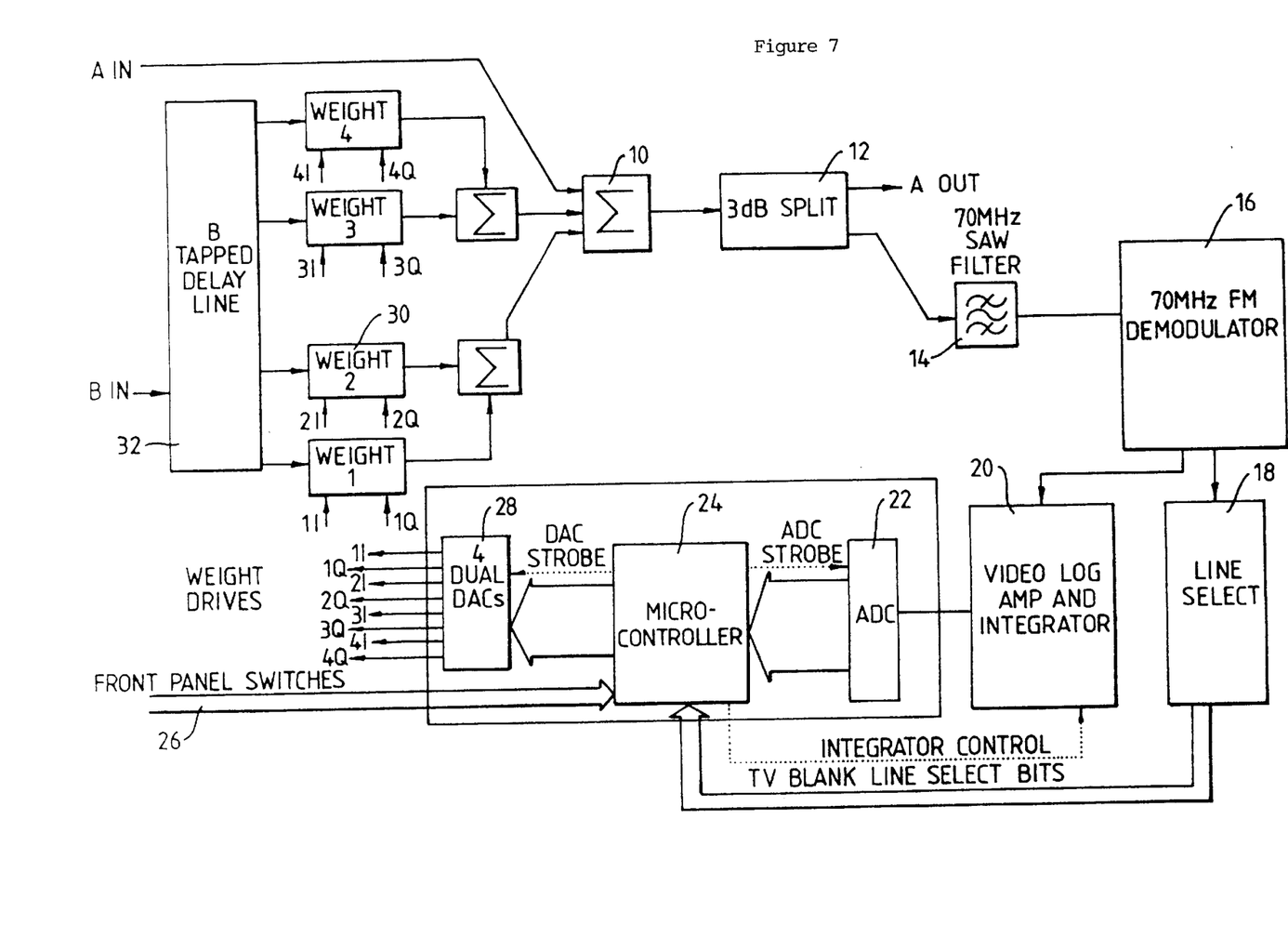
FIG. 7 is a block diagram of an arrangement for cancelling cross-polarisation interference between two radio frequency TV channels having the same carrier frequency with orthogonal polarisations.
Figure 8:
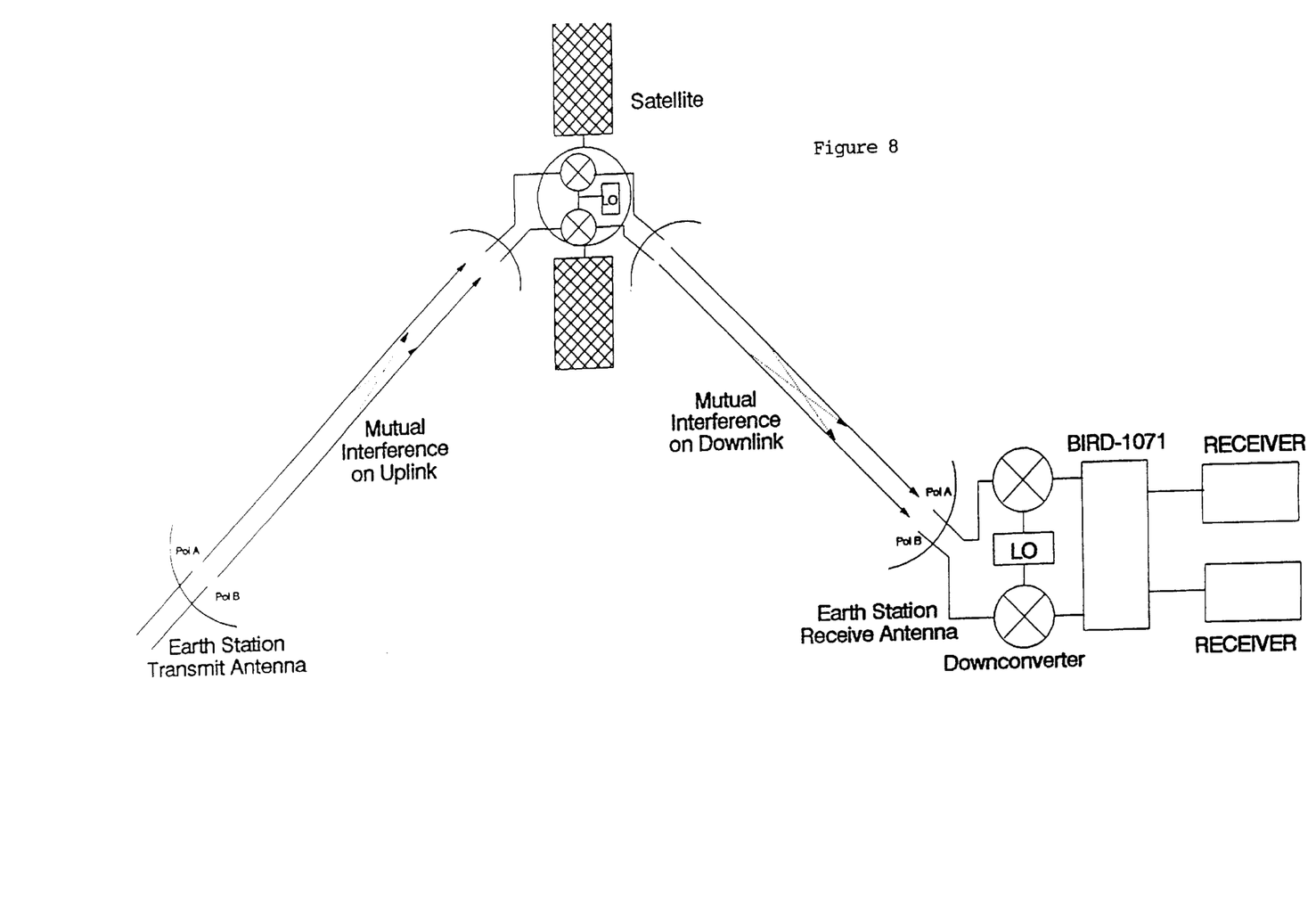
FIG. 8 illustrates a scenario of a satellite receiver in accordance with a second embodiment of the invention.

FIG. 7 shows a modified arrangement for the case where two channels are being received on the same carrier frequency but with orthogonal polarisations, a situation can potentially exist in some satellite television services. The control loop operates in the same way as for the single channel case, but is time shared between the two channels. In this case, the interference is assumed to be cross polar in origin, i.e. cross coupling between the channel A and B. Hence a sample of channel A is delayed by various amounts in delay line 32A, weighted by weights 30A, and added to channel B, and a sample of channel B is also delayed in delay line 32B, weighted by weights 30B and added to channel A. Rather than applying a single amplitude and phase adjusting weight to the coupled-off sample of interference, two weights per channel are used, one of which is fed with a slightly delayed version of the interference signal. This gives the system more tolerance to path length mis-matches between the two channels. Path length mis-matches before the cross-polar coupling has taken place are not relevant, but any delay differences between the two channels following this will degrade the broadband cancellation depth. The major source of delay miss-matches is likely to be the cabling in the earth station, which can be corrected as stated earlier.

In the case shown, only two taps per channel are provided, although more delay taps and weights are possible with a small cost penalty. It is believed that two weights per channel will be sufficient for most applications. The tapped delay lines 32A, 32B are implemented with suitably cut lengths of coaxial cable to provide the delay elements of 0 and 5 nS. One delay line is provided for each channel A, B consisting of a splitter 34A, 34B and five lengths of cable. One length of cable provides the main (unweighted) path for channel A and the other four are used as delay elements to be connected to the appropriate weights 30A, which are used to cancel interference on channel B. There is a similar delay line provided for channel B. The losses through the individual cables are compensated for with attenuation pads, and an initial amplification stage is provided to compensate for the overall loss.

A canceller could be built with only a single adaptive weight per channel, but this would not be able to achieve broadband cancellation if there were any dispersive processes occurring in either the interfering or cancelling paths. In addition, the requirement for a weighting network with extremely low dispersion is eased, resulting in a lower cost and more robust design and also allows the use of cheaper and more dispersive weights. Further, since the coupling mechanism between the interference and the wanted channel is dispersive, the broadband cancellation depth can be increased.

Figure 9:
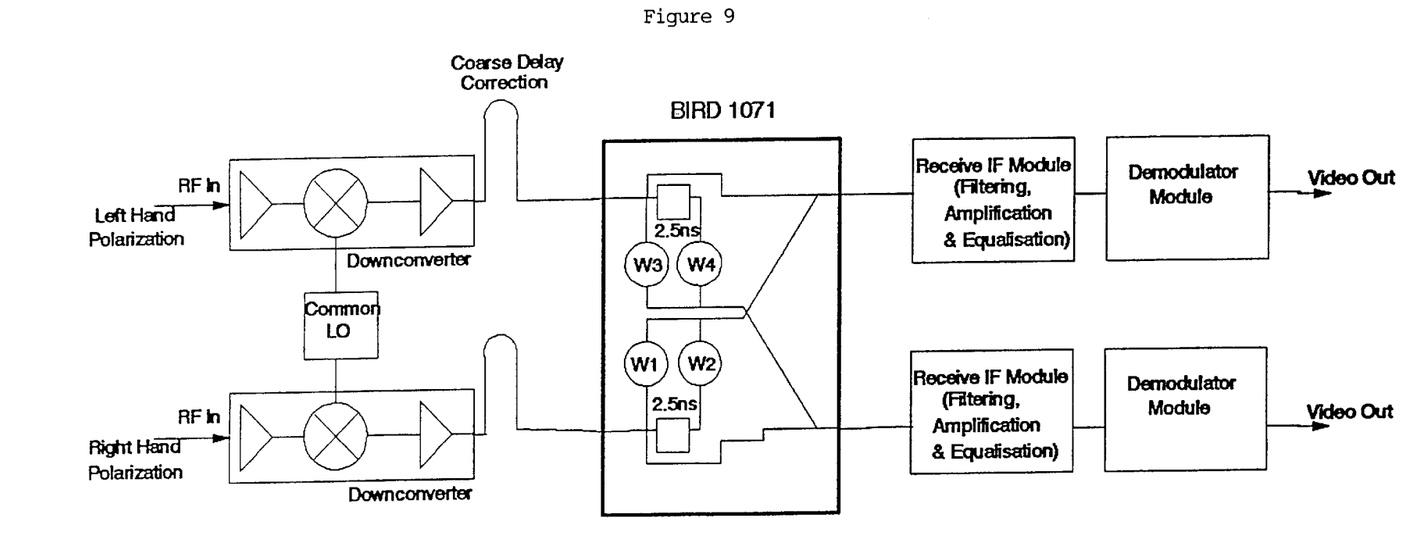
FIG. 9 illustrates a schematically the installation of a satellite receiver in accordance with a second embodiment of the invention.

In the case of the transmission of a pair of TV channels using the same carrier frequency, one apparatus would be required for reception of signals at an earth station. Typically, the device will operate at 70 MHz IF, and is installed in the signal path between the down converters and the Receive IF modules. FIG. 9 shows a typical arrangement for such a case where a first antenna element preferentially receives a wanted signal of a first polarisation and a second antenna element preferentially receives a wanted signal of a second polarisation. The apparatus is able to cancel any cross-polar interference which is introduced on the uplink to the satellite, within the satellite itself, and on the downlink. The motion of the satellite will not affect the cancellation, nor will there be a problem if the uplinks are originated at different earth stations.

One feature of the invention which enables it to achieve the improved performance is a control loop which maximizes the signal-to-interference-plus-noise ratio. The measurement of the signal-to-noise-plus-interference ratio is performed on the demodulated signals during blanking interval, by selecting a part of this period when the signal is known to be a DC level with no AC components. Any AC power is known to be interference plus noise, which is minimized by adjusting the amplitude and phase of a coupled-off portion of the signal on one channel and adding it to the other channel so that it will vectorially cancel the interference. A gradient descent perturbation algorithm is used to drive the weights to values which give the lowest measurements of interference plus noise power. The process is repeated in a time shared fashion to remove the interference on the other channel. This process will achieve a solution which optimizes the signal-to-noise-plus-interference ratio; in addition to cancelling the interference, the processor can reinforce the carrier thereby reducing the noise level on the video signal. If one channel has a high noise level, the device in accordance with the invention will not degrade the other channel because it will always find the best solution to minimize the combination of noise and interference.

If an interfering carrier turns off for a period, there will be a tendency for the weights to decay since they will be adding a small amount of noise from the interference channel to the protected channel. This will be a very slow process if the interference was originally weak, since the weights will be small and the excess noise power added onto the protected channel will be very small. This weight decay process can be prevented if a limit is set to the signal-to-noise-plus-interference ratio above which the adaptation is disabled. This adaptation threshold would be set in software, and would be a small change to the program, but great care would be needed in setting the threshold, as it would be dependent on the C/N of the particular signal being protected, and on the signal format. A system which sets a threshold at the S/(N+I) achieved after a certain amount of adaptation time could be devised. to obviate this problem.

Generally, it is sufficient that input C/I values from −30 to +10 be cancelled, whereby interference on a TV picture is rendered invisible. This aim corresponds to achieving approximately −30 dB C/I after cancellation. In practice, the range from −30 to −10 dB C/I at the input is the most important operationally, as well as being the most difficult to achieve by conventional IF power minimisation.

It can be shown that a simple IF power minimization technique will not produce any benefit in the case where two channels are interfering equally with one another, in fact it may be the case that rather than the interference being cancelled, the wanted signals may be cancelled in preference to the interference. In some cases a fortuitous phase relationship will mean that the interference is cancelled along with the wanted signal by chance; but the drive to cancel the wanted signal will always dominate. A loop driven by a measurement of S/N+I has the advantage that in addition to cancelling the interference, it will tend to produce the best possible solution by maximizing the signal power by constructive interference where possible when there is a portion of the wanted signal on the interference channel.

A direct solution approach to IF power minimization would also increase cost and complexity, and so, in practice, the choice would be between the correlation loop, and the perturbation loop. Both will arrive at the same solution for a given input, the difference being in the number of samples needed to produce the cancellation at a given loop stability.

The perturbation loop requires more samples to be taken in its adaptation process, since its gradient estimate is more noisy due to the up and down perturbations being performed at different times. Typically, adaptation speed may be less important than cost, and the perturbation loop would be favoured since it is cheaper to implement.

The weighting networks can employ a biphase attenuator design using FETs and ferrite transformers together with an op amp feedback circuit to give an inherently linear control law and automatic temperature compensation. Complex weighting networks are commercially available which would be suitable for this application, e.g. the Olektron CPM 60 (as described in the study report). However, they are expensive, and so in a multi-weight system, a cheaper implementation is preferable.

In the case of circularly polarized signals, a different group delay in the propagation of the left-hand and right-hand polarized signals is not known to occur. In the case of linear polarization, any group delay difference due to propagation effects is unlikely to be more than the equivalent of a fraction of a wavelength at RF, i.e. a negligible amount in terms of dispersion over a 20 MHz band. Any differential delay will probably be due to path length differences in the feeder cables from the antenna. This needs to be corrected to within a few nanoseconds, i.e. a few feet of cabling.

The invention can be adapted to cancel interference between channels carrying digital signals. A loop could be set up to minimize cross-polar interference between digital channels by using feedback of the error detection rate to drive a perturbation loop.

We claim:

1. A method of reducing the effect of interference on a desired radio frequency signal, said interference being constituted by a second radio frequency signal having the same or offset carrier frequency as the first signal, but having a different polarisation, the method comprising the steps of:

receiving radio frequency signals on two independent receive paths;

selecting a portion of the radio frequency signal in each receive path after demodulation where a predetermined frequency or band of frequencies is known to be absent;

measuring the signal power in each receive path in said signal portion;

splitting off from each receive path a portion of the signal in the channel;

applying to the split off signal portion of each receive path one or more weights;

summing the weighted portion of the signal in each receive path with the remaining radio frequency signal in the other receive path;

deriving from the summed signals in each receive path, feedback control signals; and applying the feedback control signals to an algorithm which determines the weight(s) applied to the split off portion of the signal in the other receive path such that the signal power in the summed signals in each receive path due to the interfering signal in the other receive path is reduced or cancelled.

2. A method according to claim 1 wherein the radio frequency signals are TV signals, the portion of each radio frequency signal selected comprises a vertical blanking interval of a demodulated television signal.

3. A method according to claim 1 wherein the algorithm is applied independently to a series of time delayed weights the outputs of which are all summed with the radio frequency signals.

4. A method according to claim 1 wherein the radio frequency signals are a TV signals, the portion of each radio frequency signal selected comprises a vertical blanking interval of a demodulated television signal and wherein the algorithm is applied independently to a series of time delayed weights the outputs of which are all summed with the radio frequency signals.

5. Apparatus for reducing interference on desired broadband radio frequency signal wherein the interference is constituted by a second radio frequency signal having the same or offset carrier frequency as the first link, but having a different polarization, the apparatus comprising:

independent first and second receive paths;

means for selecting a portion of the radio frequency link signal in each receive path after demodulation where a predetermined frequency or band of frequencies is known to be absent;

means for measuring the signal power in each receive path in each signal portion;

means for splitting off from each receive path a portion of the signal in the receive path;

means for applying to the split off portion in each receive path one or more weights;

means for summing the weighted signal portion in each receive path with the remaining radio frequency signal in the other receive path;

means for deriving from the summed signals in each receive path feedback control signals, and;

means for applying the feedback control signals to an algorithm which determines the weight(s) applied to the split off portion of the signal in the other receive path such that the signal power in the summed signals in each receive path due to the interfering signal in the other receive path is reduced or cancelled.

6. Apparatus according to claim 5 wherein the independent receive paths receive signals from first and second antenna elements.

7. Apparatus according to claim 5 wherein the independent receive paths receive signals from differently polarized first and second antenna elements.

8. Apparatus for reducing interference in a wanted broadband radio frequency link wherein an interfering signal is treated as an independent channel, the apparatus comprising:

independent first and second receive paths;

means for selecting a portion of the wanted radio frequency link signal wherein a predetermined frequency or band of frequencies is known to be absent;

means for measuring the signal power in each channel in said portion;

means for splitting off from each channel a proportion of the signal in the channel;

means for applying in each channel one or more weights to the split off proportion of the signal;

means for summing the weighted proportion of the signal in each channel with the remaining radio frequency signal in the other channel; and, means for deriving from the summed signals in each channel feedback control signals to control the weight(s) applied to the split off proportion of the signal in the other channel;

wherein the feedback signals are derived to apply a weight control algorithm to the weight(s) such that the signal power in the summed signals in each channel due to the interfering signal in the other channel is reduced or cancelled.

9. Apparatus according to claim 8 wherein the independent receive paths receive signals from first and second antenna elements.

10. Apparatus according to claim 8 wherein the independent receive paths receive signals from separately directect first and second antenna elements.

11. A method of reducing the effect of an interfering signal on a wanted broadband radio frequency signal, said interfering signal being treated as an independent channel, having the same or offset carrier frequency as the first signal, the method comprising the steps of:

receiving the radio frequency signals on two independent receive paths;

selecting a portion of the radio frequency signal in the wanted signal receive path where a predetermined frequency or band of frequencies is known to be absent;

perturbing one or more weights;

measuring the signal power in the signal portion;

splitting off from the channel a portion of the signal;

applying to the split off signal portion of the channel one or more weights;

summing the weighted portion of the signal in the channel with the remaining radio frequency signal in the other channel;

deriving from the summed signals in each channel, feedback control signals; and applying the feedback control signals to an algorithm which determines the weight(s) applied to the split off portion of the signal in the other channel such that the signal power in the summed signals in each channel due to the interfering signal in the other channel is reduced or cancelled.

12. A method according to claim 11 wherein the wanted radio frequency signal is a TV signal, the portion of the radio frequency signal selected comprises a portion of a vertical blanking interval of a demodulated television signal.

13. A method according to claim 11 wherein the algorithm is applied independently to a series of time delayed weights the outputs of which are all summed with the radio frequency link signal.

14. A method according to claim 11 wherein the wanted radio frequency signal is a TV signal, wherein the portion of the radio frequency signal selected comprises a portion of a vertical blanking interval of a demodulated television signal, and wherein the algorithm is applied independently to a series of time delayed weights the outputs of which are all summed with the radio frequency link signal.

* * * * *